D. D HAYES.
Hose-Clamp.

No. 210,422. Patented Dec. 3, 1878.

Witnesses:
Edward E. Odom
Louis H. Anderson

Inventor:
Daniel D Hayes
By G. Wm Smith
his Atty.

UNITED STATES PATENT OFFICE.

DANIEL D. HAYES, OF SAN FRANCISCO, CALIFORNIA.

IMPROVEMENT IN HOSE-CLAMPS.

Specification forming part of Letters Patent No. 210,422, dated December 3, 1878; application filed July 25, 1878.

*To all whom it may concern:*

Be it known that I, DANIEL D. HAYES, of San Francisco, in the county of San Francisco and State of California, have invented a new and useful Improved Hose-Clamp, for closing burst and ruptured hose, which invention is fully set forth in the following specification and accompanying drawings.

Figure 1:
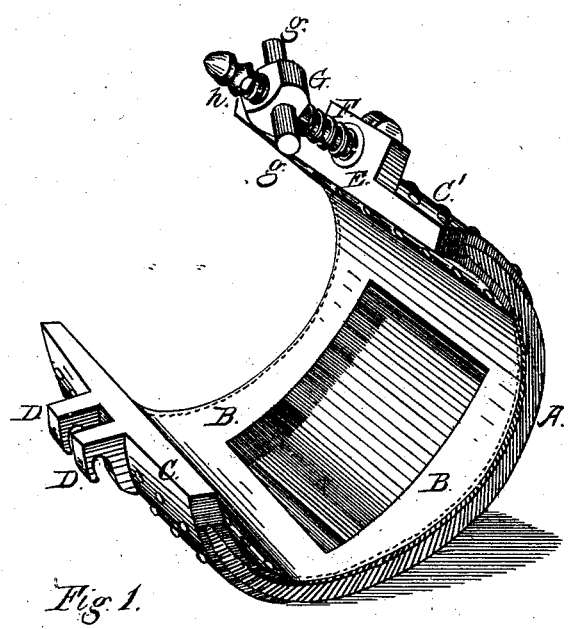
Figure 2:
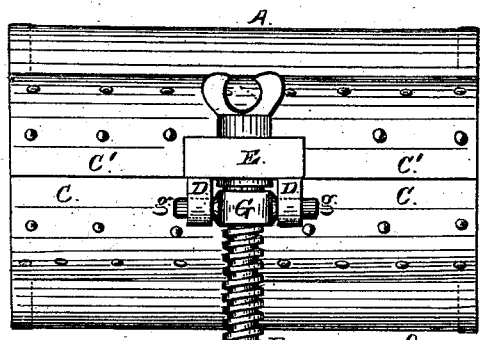
Figure 3:
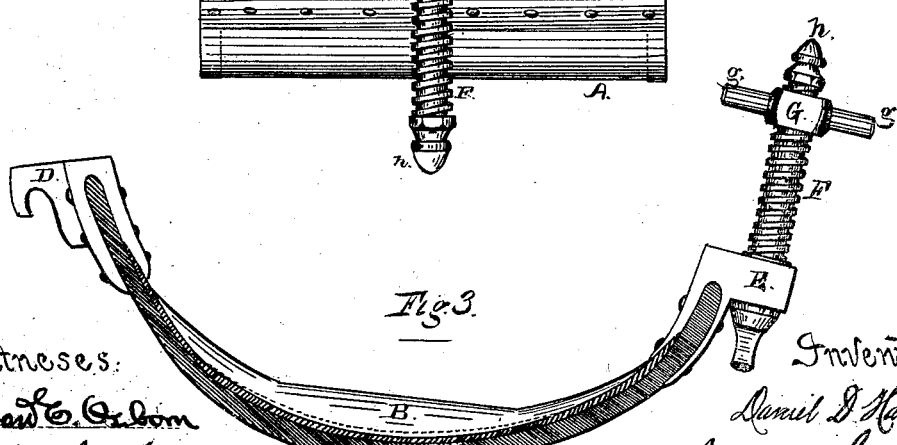

In the drawings herein referred to, Figure 1 is a perspective view of the hose-clamp opened. Fig. 2 is an end view of the same closed. Fig. 3 is a cross-section.

The object of my invention is to provide a hose-clamp for mending burst fire-engine hose, which can be quickly placed around the hose to cover and close the rupture, and a lock or fastening combined therewith, which can be easily operated to draw the two ends or edges of the clamp around the hose, and lock them securely together while the head or stream of water is still on.

It consists in the construction and arrangement, with the band or clamp, of an inside flap or pocket, the opening of which is placed directly over the rupture, so that the water filling the pocket will cause its edges to be pressed outward and against the surface of the hose and form a water-tight joint, and, in connection with the clamp, a lock or fastening of such form and construction that the curved or bulging shape of the hose when filled with water does not interfere with the proper working of the lock in drawing together the edges of the clamp, as will be fully set forth hereinafter.

In the drawings, A represents the band or part of the clamp encircling the hose. B is the flap or pocket secured to the inside of the band A around the edges, and provided with an opening in the center. The edges of this band are secured between two metal plates, C C', by rivets passing through them, as shown, or by using any other suitable means to join the two together. These plates form jaws that fit closely together when the clamp is closed. One of these plates, C, has two lugs, D D, with hooked ends, and the other plate, C', has a bearing, E, in which the screw-bolt F is swiveled. This bolt has a suitable head to enable it to be turned, and it has also a traveling nut, G, which has the pins or arms $g\ g$ projecting from it at right angles to the line of the bolt.

A head or fixed nut, $h$, on the end of the bolt, keeps the traveling nut in place, and prevents it working off and getting lost.

When the clamp is placed around the hose, and is to be drawn together, the screw-bolt F is brought down toward the lugs D D, so that the arms $g\ g$ of the traveling nut may be passed down over the lugs and slipped beneath the hooked ends, where the pressure of the hose against the bolt tends to keep the nut in place between the lugs D D, until a few turns draw the edges of the clamp together, and lock them securely.

This improved manner of constructing the lock or fastening enables the clamp to be drawn together in a quicker and better manner, and while the head of water is still on, than could be done by other screw-fastenings—as, for instance, by a bolt upon one and a fixed nut upon the other of the fastenings, where from the impossibility of directing the bolt into the nut in a straight line the parts of the clamp could not be drawn closely together while the hose was filled.

My improved fastening can also be constructed to work in a reverse manner, with the head upon the end where the fixed nut $h$ is now placed, and with the other end of the bolt F working through a screw-threaded hole in the bearing E, the traveling nut being dispensed with, and a loose collar with the arms $g\ g$ thereon substituted therefor, which collar is fixed to turn upon the head of the bolt, where the power is applied; but this construction would not depart from the nature of my invention, as above described.

The arrangement of the pocket B within the clamp causes a water-tight joint to be made all around the burst part of the hose by the pressure of the water within.

Having thus fully described my invention, what I claim, and desire to secure by Letters Patent as being new therein, is—

1. The combination, with the band A, of the hooked lugs D D, screw-bolt F, turning in bearing E, and the traveling nut G, having arms $g\ g$, substantially as and for the purposes set forth.

2. A hose-clamp for closing breaks or ruptures in hose, consisting of the band A, the interior flap or pocket, B, and the lock or fastening composed of the plates C C', the lugs D D upon one, and the screw-bolt F upon the other, with its traveling nut G, having projecting arms $g$ $g$, all constructed and arranged together substantially as described, to operate as set forth.

In testimony that I claim the foregoing I have hereunto set my hand and seal this 27th day of July, 1877.

DANIEL D. HAYES. [L. S.]

Witnesses:
C. W. M. SMITH,
WILLIAM HARNEY.